(12) United States Patent
Lim

(10) Patent No.: US 6,321,421 B1
(45) Date of Patent: Nov. 27, 2001

(54) CLIP FOR VEHICLE

(75) Inventor: Keun Sik Lim, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/473,573

(22) Filed: Dec. 28, 1999

(30) Foreign Application Priority Data

Jun. 26, 1999 (KR) .................................................. 99-24449

(51) Int. Cl.⁷ .............................. A44B 17/00; B60S 1/38
(52) U.S. Cl. .............................. 24/459; 24/522; 24/546; 15/250.39
(58) Field of Search .............................. 24/459, 522, 563, 24/716; 15/250.39

(56) References Cited

U.S. PATENT DOCUMENTS

| 411,188 | * | 9/1889 | Gira et al. | .............................. 24/546 |
| 2,511,808 | * | 6/1950 | Petri | .............................. 24/459 |
| 2,704,872 | * | 3/1955 | Waggoner et al. | .............................. 24/522 |
| 3,665,544 | * | 5/1972 | Sakamoto | .............................. 15/250.42 |
| 3,866,260 | * | 2/1975 | Cone | .............................. 15/250.31 |
| 3,919,736 | * | 11/1975 | Bourassa et al. | .............................. 15/250.36 |
| 4,156,951 | * | 6/1979 | Sharp | .............................. 15/250.42 |

* cited by examiner

Primary Examiner—Victor N. Sakran
(74) Attorney, Agent, or Firm—Christie, Parker & Hale, LLP

(57) ABSTRACT

The present invention relates to a clip used in connecting between a wiper blade and a wiper arm of a vehicle that can eliminate the generation of a gap which used to be present when assembling a wiper arm and conventional type of clips. The clip of the present invention, when installed into the main shaft of a wiper blade so that it can wrap around a wiper arm, can not only prevent the generation of a gap between a wiper arm and the clip, but also eliminate the trembling phenomenon of a wiper arm and the resulting noise that used to occur in the conventional type of clips during the normal operation.

7 Claims, 2 Drawing Sheets

CLIP FOR VEHICLE

BACKGROUND OF THE INVENTION

1. Field of the Invention

The present invention relates to a clip used in connecting a wiper blade to a wiper arm of a vehicle, more particularly, to a clip that can eliminate the generation of a gap which is present when assembling a wiper arm using conventional type of clips.

2. Description of the Prior Art

It has been quite common to utilize a clip in connecting a wiper arm and a wiper blade of a vehicle. As shown in FIG. 3, the conventional clip (10b) used for this purpose is "U"-shaped and there is also a projected stopper (16) on the lower part of one end. Here, the above clip (10b) is set to be positioned on the cental shaft of the wiper blade (12) so that the inner side of the clip can wrap around the shaft to be locked into the place. Then, the crooked end of the wiper arm (14) with a fitting groove (20) is inserted onto the top of the above wiper blade (12) in such a fashion that the end of the wiper arm (14) covers the outer surface of the above clip (10b), and the projected stopper (16) of the above clip (10b) gets positioned into the fitting groove (20) of the wiper arm (14) and the assembly process of the wiper arm comes to an end.

However, the aforementioned conventional clip that relies on the connection between the projected stopper (16) and the fitting groove (20) of the wiper arm (14) has the problem of generating a gap between the inner surface of the wiper arm (14) and the outer surface of the clip (10b) thus causing the wiper arm to tremble and make noise and subsequently incapable of well performing its own wiping activity.

SUMMARY OF THE INVENTION

The object of the present invention is to provide a clip used in connecting between a wiper blade and a wiper arm of a vehicle, more particularly, to the clip which has an elastically supported end part and thus enables to eliminate the gap generally produced between a wiper arm and a conventional type of a clip when they are assembled together. The clip of the present invention, when installed into the main shaft of a wiper blade so that it can wrap around a wiper arm, can not only prevent the generation of a gap between a wiper arm and the clip, but also eliminate the trembling phenomenon of a wiper arm and the resulting noise that used to occur in the conventional type of clips during the normal operation.

[Code Explanation for the major parts]

| | |
|---|---|
| 10a, 10b: clip | 12: wiper blade |
| 14: wiper arm | 16: projected stopper |
| 18: gap-absorbing end | 20: fitting groove |

DETAILED DESCRIPTION OF THE PREFERRED EMBODIMENT

The present invention relates to a clip used in connecting a wiper blade and a wiper arm of a vehicle which has an elastically supported end of plastic and thus enables to prevent the formation of a gap generally produced between a wiper arm and a conventional clip when they are assembled together.

Figure 1:
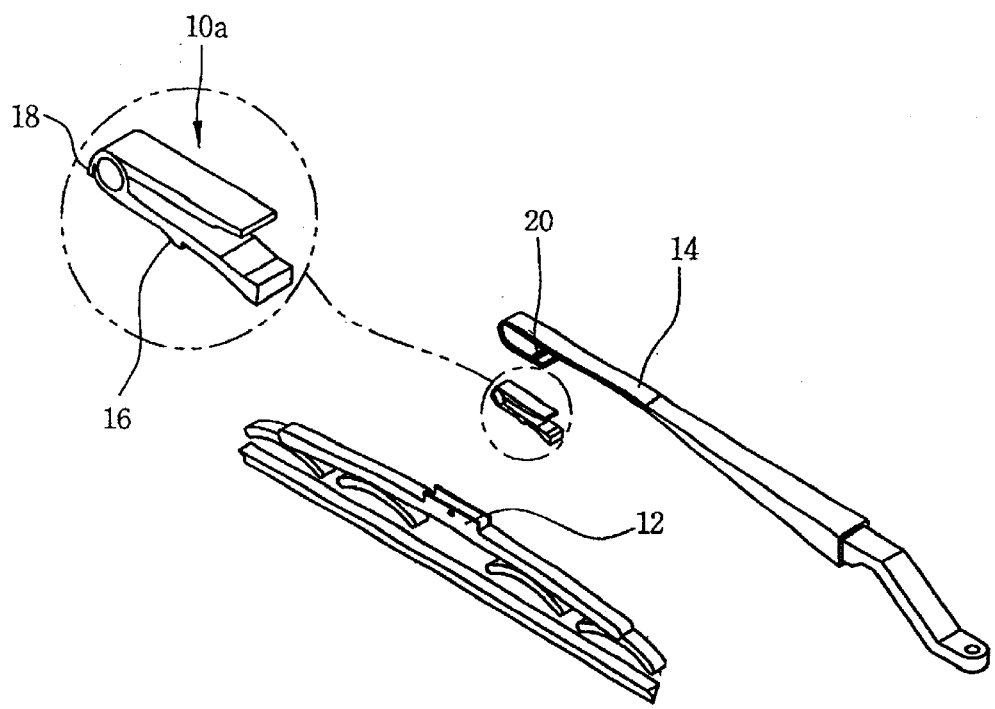
FIG. 1 shows a perspective view of the clip in the present invention.

The detailed description of the present invention is as follows. The clip of the present invention is designed to be assembled into the main shaft of a wiper blade (12) so that it can encompass the outer surface of a wiper arm (14). As shown in FIG. 1, the clip (10a) of the present invention is also "U" shaped and has a projected stopper (16) on the longer part of the clip as in the conventional clips. However, there is a gap-absorbing end (18) in the present invention which is formed with a sharp angle on the outer surface of the curved clip's (10a) cental part and extends a certain length as a unit; in addition, the gap-absorbing end (18) is made of plastic and thus has elastic properties.

Figure 2:
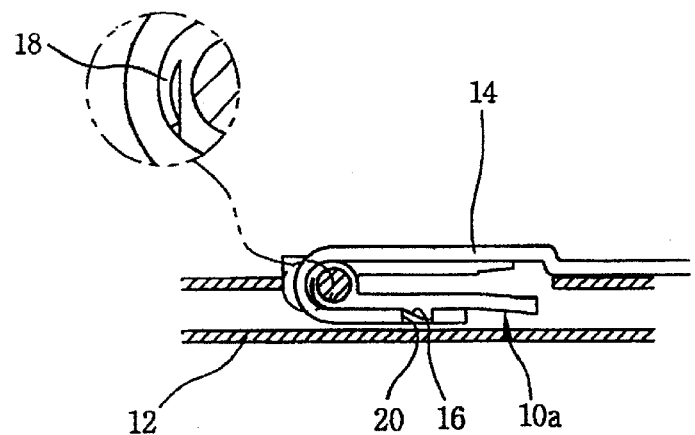
FIG. 2 shows a cross-sectional view of the clip after assembly in the present invention.
Figure 3:
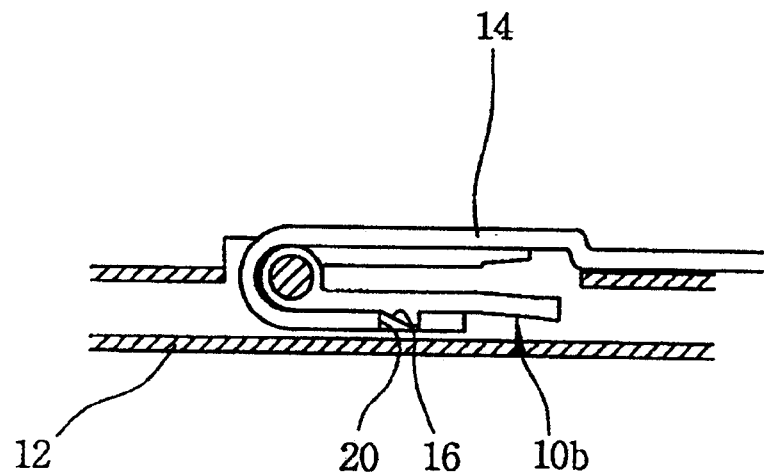
FIG. 3 shows a cross-sectional view of a conventional clip of a vehicle.

The wiper blade (12) shown in FIG. 2 is designed in such a way that there is a wiper rubber attached to the lower part of the above wiper blade (12) to wipe off the front glass of a vehicle, whereas a wiper arm (14) is attached to the upper part of the wiper blade (12) for the revolution of the blade. In the center of the above wiper blade (14), there is a central shaft which the above clip (10a) will be fitted into and the assembly of the wiper arm (14) to this clip will be followed in turn. The way that the "U"-shaped clip (10a) is fitted into the above shaft is that the inner face of the clip's center can contact the outer surface of the shaft. Then, the crooked end of the wiper arm (14) on which the fitting groove is made is inserted onto the top of the wiper blade (12) and the inner face of the crooked part embraces the outer surface of the above clip (10a). Subsequently, the projected stopper (16) of the clip (10a) is assembled to the fitting groove (20) of the wiper arm (14), and the crooked inner part of the wiper arm (14) is kept closely contacted with the gap-absorbing end (18) due to its elastic property, thus preventing the gap that used to be present in between the wiper arm (14) and the conventional clip (10b).

What is claimed is:

1. A clip, positioned on a central shaft of a wiper blade and used in connecting a wiper blade and a wiper arm of a vehicle, which is characterized by having a gap-absorbing elastic end of plastic on an outer surface of the clip's center which is wrapped around the cental shaft of the wiper blade.

2. A wiper as recited in claim 1 wherein the clip is U-shaped comprising a first part, a second part and the center there between.

3. A wiper as recited in claim 2 wherein the first part, the second part and the center are integral with each other.

4. A wiper assembly comprising:
   a wiper arm comprising a bent generally U-shaped portion;
   a wiper blade;
   a generally U-shaped clip fitted within the wiper arm bent portion and having a plastic gap absorbing portion for occupying a gap between the clip and the bent portion, wherein the wiper blade is coupled to the clip.

5. A wiper assembly as recited in claim 4 wherein the clip comprises a first part opposite a second part and a central part there between.

6. A wiper assembly as recited in claim 5 wherein the gap absorbing portion extends from the central part.

7. A wiper assembly as recited in claim 6 wherein the wiper blade comprises a shaft and wherein the central portion comprises an opening for accommodating the shaft.

* * * * *